Figure 1:
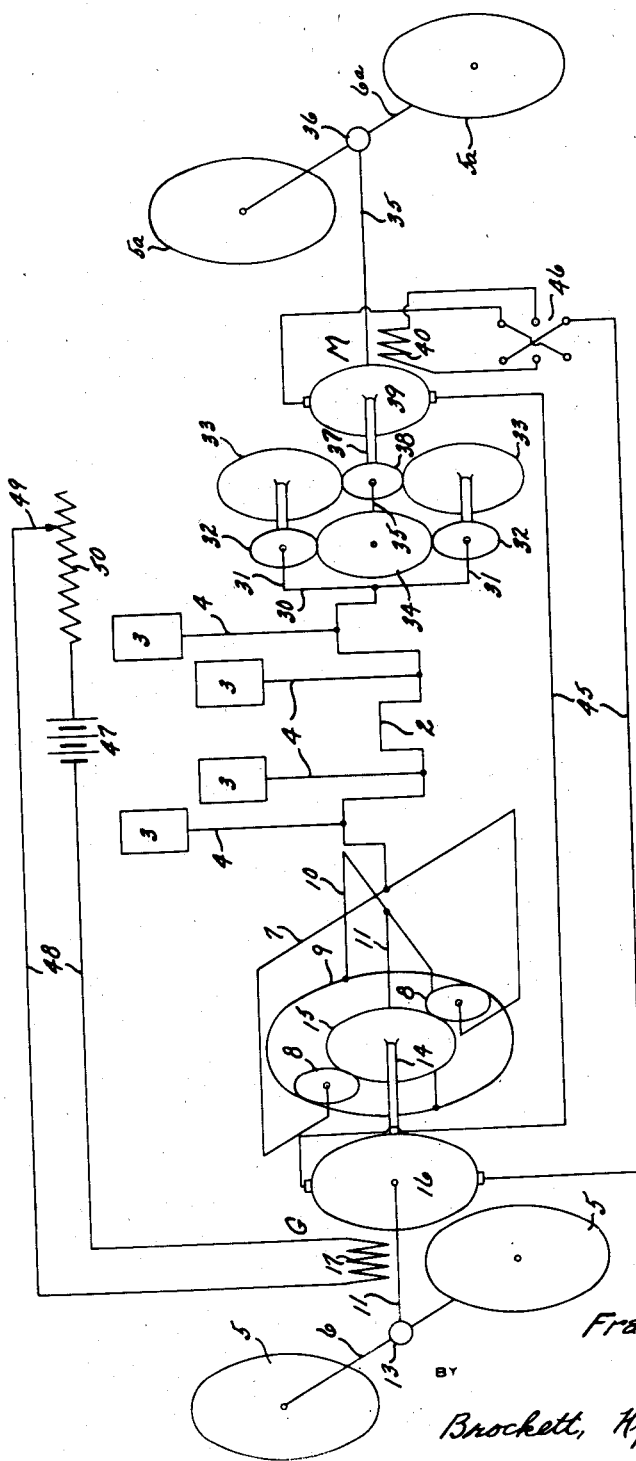

Aug. 4, 1931.　　　F. R. HIGLEY　　　1,817,820
POWER TRANSMISSION MEANS
Filed May 31, 1930　　2 Sheets-Sheet 2

INVENTOR
Frank R. Higley
BY
Brockett, Hyde, Higley & Meyer
ATTORNEYS

Patented Aug. 4, 1931

1,817,820

UNITED STATES PATENT OFFICE

FRANK R. HIGLEY, OF CLEVELAND HEIGHTS, OHIO

POWER TRANSMISSION MEANS

Application filed May 31, 1930. Serial No. 458,135.

This invention comprises a power transmision system for employment in connection with a prime mover having limited output characteristics, for driving therefrom with better torque and speed characteristics, a pair of independent means which are to be given like drive.

The invention is particularly applicable to automative vehicles having internal combustion engines for prime movers, and the invention is of especial advantage where two or more wheels upon separate axles are to provide the traction for locomotion. This latter arrangement is exemplified in what is commonly known in the automotive art as the "four-wheel drive".

The primary object then of the invention is to provide in combination with a prime mover, means whereby a pair of loads may be together driven from a standstill by operation of the prime mover as from idling speed, but with the torque-speed characteristics controlled at the will of the operator.

Another object of the invention is to provide for an automotive vehicle like drive of a pair or more of wheels upon separate axles, as front and rear wheels.

Another object of the invention is to provide such a drive, from the nature of which, supposing a front pair of wheels driven together and a rear pair of wheels driven together, all four wheels may have like drive, yet drive of such nature that the employment of a specific differential between the one pair of wheels and the other is unnecessary.

To accomplish these objects and as a further object of the invention, I employ a pair of differential means one associated with either end of the drive shaft of the prime mover. Thus, at the forward end of the engine I may provide differential means having a pair of differentially related output elements and an input element in driven relation with the forward end of the engine crank shaft; and rearward of the engine I may arrange a second differential means having an output element and a pair of input elements with one of its input elements in driven relation with the rearward end of the engine crank shaft; and arrange means for causing one of the pair of output elements of the first differential means to drive the other input element of the second differential means.

I so proportion and arrange the parts, as an object of the invention, that the power of the described drive between the forward and rearward differential means is a relatively small portion of the power output of the engine. Conveniently electrical means are employed for the drive, in which case in the above arrangement, an electric generator is associated with one of the output elements of the forward differential means, and a motor, arranged to be driven by the generator, is associated with one of the input elements of the rearward differential means.

As a further obect of the invention, I provide governing means for the engine responsive to the speed of the generator.

Figure 2:
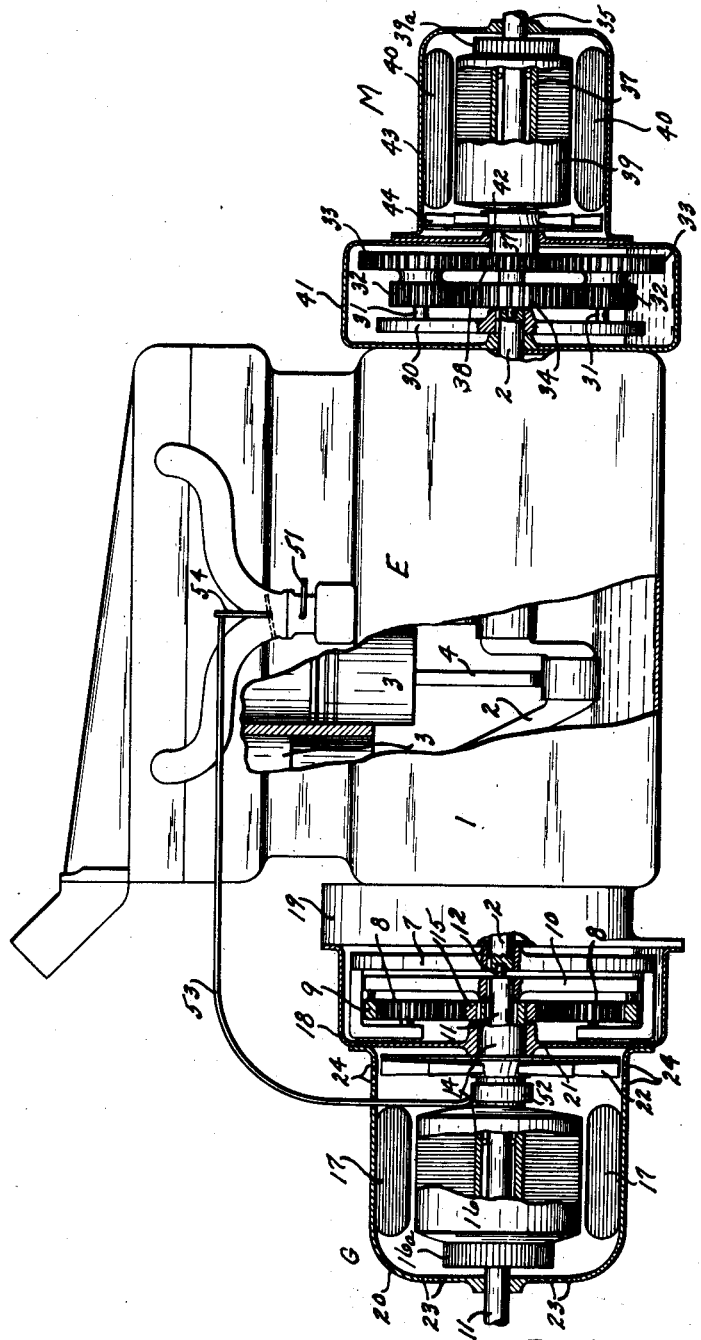

The exact nature of the invention together with further objects and advantages thereof will be apparent from the following description taken in connection with the accompanying drawings, in which Fig. 1 is a diagrammatic showing illustrative of the working principles of the invention and showing the same as applied to a vehicle; and Fig. 2 shows largely conventionally an embodiment of the invention, similar reference characters being applied to the same or corresponding parts in the two figures.

With reference now to the drawings, E represents an internal combustion engine having its crank shaft 2 driven by the usual pistons 3, through connecting rods 4. The engine may be that to be employed for propulsion of a vehicle having pairs of wheels 5 and 5a carried upon driving axles 6 and 6a respectively which may be considered as front and rear axles respectively; and it will be understood that these parts are associated by the frame, springs, universal joints, and other usual chassis parts including steering means for one or both pairs of wheels—showing of all of which is omitted for clarity and as forming no part of this invention.

Upon one end of the engine crank shaft 2 as at the forward end, is secured a yoke or flywheel 7 to be driven thereby, upon which yoke is mounted for free rotation one or more pinions 8 equally spaced from the general center line of the parts.

Arranged about and meshing with the pinions 8 is an internally toothed ring gear 9 carried by a yoke 10 arranged to move within the yoke 7 which latter yoke is arched as indicated to clear the yoke 10 and its ring gear 9. The yoke 10 is secured with a shaft 11 aligned with the shaft 2 and preferably having a free bearing therewith as at 12. The shaft 11 extends forwardly to driving connection with the axle 6 which is split and includes the usual bevel and differential gears within a housing 13 whereby the wheels 5 may be positively driven by the shaft 11 yet allowed such relative motion as is necessary in turning corners.

Carried by the shaft 11 for free rotation thereupon is a sleeve 14 upon which is secured a pinion 15 meshing with the pinions 8. Secured upon the sleeve 14 is also the rotor or armature 16 of a generator G, having stator field coils 17 cooperative with the rotor.

The described gears are carried in a housing 18 rigidly secured with the crank case 1 of the engine E as by the indicated connection with the timing gear housing 19 of the engine; and the generator G is likewise provided with the usual housing 20, one of the housing parts providing a partition 21 having a bearing for the sleeve 14 and providing that the gears may run in lubricant which is prevented access to the electrical parts. The generator may preferably be provided with the usual fan 22 for cooling circulation between inlet openings 23 and outlet openings 24 in the generator housing.

It will be apparent that the described gearing provides for drive of both the shaft 11 and the generator rotor by the corresponding end of the crank shaft of the engine, the driven parts being actuated in differential relation through a differential system of gears which, for simplicity and by way of example, have been illustrated as of the usual sun and planet type; so that while the engine E is running the shaft 11 and thus the wheels 5 may be stationary providing the generator rotor be driven at a speed greater than that of the engine crank shaft. Thus, supposing the ratio of teeth on the gears 9, 8 and 15 be 4:1:2, the engine may idle at 200 revolutions per minute right-hand, and with the vehicle stationary the generator rotor will be driven right-hand at 600 R. P. M. Likewise, with the engine running at say 2000 R. P. M. and the generator rotor moving at the same speed, the wheels will propel the vehicle at a speed dependent upon the ratio of drive between the shaft 11 and the axle 6; under which condition the sleeve 14 will have no motion upon the shaft 11 nor will any of the gears have pitch speeds.

Upon the opposite or rearward end of the engine crank shaft 2 is secured for rotation thereby a yoke or flywheel 30 having one or more arms 31 upon each of which is mounted for free rotation a rigidly interassociated planetary pair of gears including pinions 32 and larger gears 33. A gear 34 is secured upon a shaft 35 in alignment with the crank shaft 2, to mesh with the pinions 32. The shaft 35 extends rearwardly to driving connection with the wheels 5a by way of the axle 6a including differential housing 36, and the forward end of the shaft 35 is preferably steadied in the crank shaft 2 as indicated.

Mounted for free rotation on the shaft 35 is a sleeve 37 with which is secured a pinion 38 meshing with the gears 33. The sleeve 37 carries the armature or rotor 39 of the motor M having the usual cooperative field or stator coils 40. The last described gearing is carried in a housing 41 providing a bearing at 42 for the sleeve 37, and the motor has a housing 43 so that the parts are provided with rigid bearings, supported and maintained in alignment. Likewise cooling of the motor is provided by the usual arrangement including a fan 44.

It will be apparent that the described arrangement is such that the shafts 35, and thus the rear vehicle axle as well, are arranged to be driven both by the engine E and the motor M in differential relation, the described differential gearing accomplishing such result and being of compound epicyclic type. For example, if the tooth ratios of the gears 38, 33, 32 and 34 be respectively 1:2:1:2 and the engine idling at 200 R. P. M. right-hand with the wheels 5a motionless, the rotor of the motor M will be idled at 600 R. P. M. left-hand; whereas when both the engine and the rotor are operating at say 2000 R. P. M. right-hand, the shaft 35 will be driven at 2000 R. P. M. right-hand and the gears between these parts will be relatively motionless.

The motor M is arranged to be driven by the generator G. For this purpose, these parts being indicated as direct current machines, the commutator 16a of the rotor 16 has connection with the motor as indicated through wires 45 and reversing switch 46, the current passing successively through the rotor 39, commutator 39a and field 40, of the motor M, the motor being of series type and the brushes indicated Fig. 1 being associated with the two commutators as usual. The field 17 of the generator G is shown as excited by a battery 47 through a line 48 subject to control of a movable contactor 49 for a variable resistance 50. By the described system it will be apparent that the generator output, and consequently the effective coupling between generator and motor, will be controlled by the contractor 49, and that the control circuit may be of low voltage while the motor M may operate on a high voltage; although this arrangement has been chosen for illustration merely and may be varied as will be appreciated by one familiar with the art.

Analysis of what has been described will show that, between the engine means and one of its driven means, the pair of wheels 5, there is arranged differential means having a pair of differentially related output elements 9 and 15, and an input element 8, in driven relation with the drive shaft 2 of the engine means; one of its output elements 9 being in driving relation with the wheels 5, and the other output element 15, in driving relation with the generator rotor. And between the engine means and the other of its driven means, the other pair of wheels 5a, there is arranged a second differential means having an output element 34, and a pair of input elements 31 and 38, with one of its input elements, 30, in driven relation with the opposite end of the drive shaft 2; its output element being in driving relation with the wheels 5a, and its other input element 38 in driven relation with the motor rotor.

The proportion and arrangement of the parts is such that the motor and generator form a properly balanced pair of units, that is, the generator is of sufficient capacity that at its operating speeds it will drive the motor through its operating speeds. Thus, at 1000 R. P. M. operation of the engine with the vehicle operating at corresponding speed, the shafts 11 and 35 running at 1000 R. P. M. and the resistance 50 cut out of its line to fully energize the generator field, both the generator and the motor will likewise be driven at 1000 R. P. M. The differential ratios provided by the two described sets of gearing are likewise proportioned to this end.

Preferably, that the generator and motor units may be relatively small and consequently inexpensive, the gearing is so proportioned, as described, that the greater part of the drive to each pair of wheels is positive or mechanical, directly by way of the corresponding gearing.

Operation will be as follows: Assuming the engine idling and the contactor 49 off its resistance to open the generator field circuit, since the generator is delivering no current its rotor idles freely at a speed greater than engine speed. Thus the wheels 5 remain stationary. Likewise since no current is delivered to the motor M its rotor idles freely but in reverse direction and no actuating force is applied to the wheels 5a. Suppose now the contactor 49 set as indicated to partially energize the field of the generator, the engine preferably being coincidentally speeded up by the usual manipulation of its throttle 51. The generator will commence to deliver current to the motor and consequently its rotor will tend to slow down. Assuming the engine speed constant, however, any decrease in the generator rotor speed is accompanied by a corresponding driving force on the wheels 5; and simultaneously current delivered to the motor M tends to slow down its rotor, which in turn initiates actuation of the wheels 5a. Thus locomotion of the vehicle commences with tractive effort applied through all four wheels. The engine still running, the generator decreases its speed and the motor likewise until the motor rotor speed attains that corresponding with the generator output determined by the setting of the contactor 49. As these conditions of balance are approached, the leverage of the engine upon the wheels provided by the two differential sets is decreased and the pitch speeds of the gears likewise decreased, all as the vehicle speed increases relative to engine speed.

It will be observed that the absolute speed of the motor rotor is first decreasing, the motor originally acting actually as a dynamic brake rather than as a motor. The motor torque is always delivered in the same direction, but the speed range of the motor corresponding with vehicle speed from zero to maximum, is from a maximum left-hand to a maximum right-hand and consequently through zero.

Ultimately the resistance 50 is cut out so that the generator may deliver maximum power to the motor. When this is done, the parts being properly proportioned the generator will seek and ultimately arrive at a speed equal to that of the engine crank shaft and the motor will reach the same speed, its rotor meanwhile having decelerated to zero, reversed and accelerated in crank-shaft direction, so that all of the gears will be relatively stationary and the engine crank shaft, the rotors and the drive shafts 11 and 35 will operate at the same speed, and the vehicle will move at its corresponding maximum driven speed.

It will therefore be observed that acceleration of the vehicle from zero to maximum speed is accompanied by deceleration of the generator from an idling speed greater than that of the engine to one equal to the engine speed; and on the part of the motor is accompanied by a change from maximum idling speed in reverse direction, to the speed and direction of the engine.

Under all conditions drive of one pair of wheels by the engine is shared with the generator, and drive of the other pair of wheels is by both the engine and the motor.

To reverse the vehicle the switch 46 is thrown to cause the motor rotor when driven by the generator to operate in reverse direction at a speed higher than its normal idling speed in this direction. Thus when the contactor 49 is moved to energize the generator field, although the tendency will be to drive the wheels 5 in one direction, there will be a greater tendency to drive the wheels 5a in the opposite direction and the vehicle will move rearwardly but at slow speed.

That the two rotors may be protected against excessive speeds I provide governing means for controlling the engine speed dependent upon that of the generator rotor. To this end a speed-responsive element 52 may be mounted upon the sleeve 14 and have connection as by the Bowden wire indicated at 53 with a governing throttle 54 for the engine.

What I claim is:

1. In combination with engine means, differential means having a pair of differentially related output elements and an input element in driven relation with said engine means, a second differential means having an output element and a pair of input elements, with one of its said input elements in driven relation with said engine means, and means for causing one of said pair of output elements to drive the other of said pair of input elements.

2. In combination with engine means, differential means having a pair of differentially related output elements and an input element in driven relation with said engine means, a second differential means having an output element and a pair of input elements, with one of its said input elements in driven relation with said engine means, and means for causing one of said pair of output elements to drive the other of said pair of input elements, the parts being so proportioned and arranged that the power of said drive between differential elements of pairs thereof will be a relatively small portion of that developed by said engine.

3. In combination with engine means, differential means having a pair of differentially related output elements and an input element in driven relation with said engine means, generator means in driven relation with one of said output elements, a second differential means having an output element and a pair of input elements, with one of its said input elements in driven relation with said engine means, motor means in driving relation with the other of said pair of input elements, and means providing controlled driving association of said generator means with said motor means.

4. In combination with engine means, differential means having a pair of differentially related output elements and an input element in driven relation with said engine means, generator means in driven relation with one of said output elements, a second differential means having an output element and a pair of input elements, with one of its said input elements in driven relation with said engine means, motor means in driving relation with the other of said pair of input elements, means providing driving association of said generator means with said motor means, and means for controlling the generator output.

5. In combination with engine means having a driven shaft, differential means having a pair of differentially related output elements and an input element in driven relation with one end of said shaft, a second differential means having an output element and a pair of input elements, with one of its said input elements in driven relation with the other end of said shaft, and means for causing one of said pair of output elements to drive the other of said pair of input elements.

6. In combination with engine means having a drive shaft, differential means having a pair of differentially related output elements and an input element in driven relation with one end of said shaft, generator means in driven relation with one of said output elements, a second differential means having an output element and a pair of input elements, with one of its said input elements in driven relation with the other end of said shaft, motor means in driving relation with the other of said pair of input elements, and means providing driving association of said generator means with said motor means.

7. In combination with engine means, differential means having a pair of differentially related output elements and an input element in driven relation with said engine means, generator means in driven relation with one of said output elements and having a rotor in aligned relation with the other of said output elements, a second differential means having an output element and a pair of input elements, with one of its said input elements in driven relation with said engine means, motor means in driving relation with the other of said input elements and having a rotor in aligned relation with said output element, and means providing controlled driving association of said generator means with said motor means.

8. In combination with engine means, differential means having a pair of differentially related output elements and an input element in driven relation with said engine means, an output shaft driven by one of said output elements, generator means in driven relation with the other of said output elements and having a rotor mounted upon said shaft, a second differential means having an output element and a pair of input elements, with one of its said input elements in driven relation with said engine means, an output shaft in driven relation with said output element, motor means in driving relation with the other of said pair of input elements and having a rotor mounted upon said second output shaft, and means providing controlled driving association of said generator means with said motor means.

9. In combination with engine means, differential means having a pair of differentially related output elements and an input element in driven relation with said engine means, a second differential means having an output element and a pair of input elements, with one of its said input elements in driven relation with said engine means, means for causing one of said pair of output elements to drive the other of said pair of input elements, and governing means for said engine means arranged to be responsive to the speed of said output element of said pair thereof.

10. In combination with engine means, differential means having a pair of differentially related output elements and an input element in driven relation with said engine means, generator means in driven relation with one of said output elements, a second differential means having an output element and a pair of input elements, with one of its said input elements in driven relation with said engine means, motor means in driving relation with the other of said pair of input elements, means providing controlled driving association of said generator means with said motor means, and governing means for said engine means arranged to be responsive to the speed of said generator means.

11. In an automotive vehicle having a plurality of traction wheels and an engine for driving the same, differential means having a pair of differentially related output elements and an input element in driven relation with said engine, one of said wheels being in driven relation with one of said output elements, a second differential means having an output element and a pair of input elements, with one of its said input elements in driven relation with said engine, and its said output element in driving relation with another of said wheels, and means for causing the other of said pair of output elements to drive the other of said pair of input elements.

12. In an automotive vehicle having a plurality of traction wheels and an engine for driving the same, differential means having a pair of differentially related output elements and an input element in driven relation with said engine, one of said wheels being in driven relation with one of said output elements, a second differential means having an output element and a pair of input elements, with one of its said input elements in driven relation with said engine, and its said output element in driving relation with another of said wheels, and means for causing the other of said pair of output elements to drive the other of said pair of input elements, the parts being so proportioned and arranged that the power required for said drive between differential elements of pairs thereof will be a relatively small portion of that developed by said engine.

13. In an automotive vehicle having a plurality of traction wheels and an engine for driving the same, differential means having a pair of differentially related output elements and an input element in driven relation with said engine, one of said wheels being in driven relation with one of said output elements, generator means in driven relation with the other of said output elements, a second differential means having an output element and a pair of input elements, with one of its said input elements in driven relation with said engine, motor means in driven relation with the other of the pair of input elements, another of said wheels being in driven relation with the output element of said second differential means, and means providing controlled driving association of said generator means with said motor means.

14. In an automotive vehicle having a plurality of traction wheels and an engine with a drive shaft for driving said wheels, differential means having a pair of differentially related output elements and an input element in driven relation with one end of said shaft, one of said traction wheels being in driven relation with one of said output elements, a second differential means having an output element and a pair of input elements, with one of its said input elements in driven relation with the other end of said shaft, another of said wheels being in driven relation with its output element, and means for causing the other of said pair of output elements to drive the other of said pair of input elements.

15. In an automotive vehicle having a plurality of traction wheels and an engine with a drive shaft for driving said wheels, differential means having a pair of differentially-related output elements and an input element in driven relation at one end of said shaft, one of said traction wheels being in driven relation with one of said output elements, generator means in driven relation with the other of said output elements, a second differential means having an output element and a pair of input elements, with one of its said input elements in driven relation with the other end of said shaft, another of said wheels being in driven relation with its said output element, motor means in driving relation with the other of its said pair of input elements, and means providing controlled driving association of said generator means with said motor means.

16. In an automotive vehicle having a plurality of traction wheels including forward and rearward wheels, and an engine with a drive shaft arranged fore-and-aft of the vehicle for driving said wheels, differential means having a pair of differentially related output elements and an input element in driven relation with one end of said shaft, one of said traction wheels being correspondingly near and in driven relation with one of said output elements, a second differential means having an output element and a pair of input elements, with one of its said input elements in driven relation with the other end of said shaft, and its output element in driving relation with another of said wheels, correspondingly near to its end of said shaft, and means for causing the other of said pair of output elements to drive the other of said pair of input elements.

17. In an automotive vehicle having a plurality of traction wheels and an engine for driving the same, differential means having a pair of differentially related output elements and an input element in driven relation with said engine, one of said wheels being in driven relation with one of said output elements, generator means in driven relation with the other of said output elements, a second differential means having an output element and a pair of input elements, with one of its said input elements in driven relation with said engine, motor means in driven relation with the other of the pair of input elements, another of said wheels being in driven relation with the output element of said second differential means, means providing controlled driving association of said generator means with said motor means, the parts being so proportioned and arranged that under normal travelling conditions the speed of said generator means will approximate that of the wheel-driving output element of said first differential means, and whereby that of said engine will approximate that of the output element of said second differential means.

18. In an automotive vehicle having a plurality of traction wheels and an engine for driving the same, differential means having a pair of differentially related output elements and an input element in driven relation with said engine, one of said wheels being in driven relation with one of said output elements, generator means in driven relation with the other of said output elements, a second differential means having an output element and a pair of input elements, with one of its said input elements in driven relation with said engine, motor means in driven relation with the other of the pair of input elements, another of said wheels being in driven relation with the output element of said second differential means, means providing controlled driving association of said generator means with said motor means, the parts being so proportioned and arranged that under vehicle accelerating conditions the speed of said generator means will approach that of the wheel-driving output element of said first differential means, and whereby that of said engine will approach that of the output element of said second differential means.

19. In an automotive vehicle having a plurality of traction wheels and an engine for driving the same, differential means having a pair of differentially related output elements and an input element in driven relation with said engine, one of said wheels being in driven relation with one of said output elements, a second differential means having an output element and a pair of input elements, with one of its said input elements in driven relation with said engine, and its said output element in driving relation with another of said wheels, means for causing the other of said pair of output elements to drive the other of said pair of input elements, and governing means for said engine arranged to be responsive to the speed of said output element of said pair thereof.

20. In an automotive vehicle having a plurality of traction wheels and an engine for driving the same, differential means having a pair of differentially related output elements and an input element in driven relation with said engine, one of said wheels being in driven relation with one of said output elements, generator means in driven relation with the other of said output elements, a second differential means having an output element and a pair of input elements, with one of its said input elements in driven relation with said engine, motor means in driven relation with the other of the pair of input elements, another of said wheels being in driven relation with the output element of said second differential means, means providing controlled driving association of said generator means with said motor means, and governing means for said engine arranged to be responsive to the speed of said generator means.

21. In an automotive vehicle having a plurality of traction wheels and an engine for driving the same, differential means having a pair of differentially related output elements and an input element in driven relation with said engine, one of said wheels being in driven relation with one of said output elements, generator means in driven relation with the other of said output elements, a second differential means having an output element and a pair of input elements, with one of its said input elements in driven relation of said engine, motor means in driven relation with the other of the pair of input elements, another of said wheels being in driven relation with the output element of said second differential means, means providing controlled driving association of said generator means with said motor means, the parts being so proportioned and arranged that the power of said drive between said generator means and motor means will be a relatively small portion of that developed by said engine, and governing means for said engine arranged to be responsive to the speed of said generator means.

In testimony whereof I hereby affix my signature.

FRANK R. HIGLEY.

CERTIFICATE OF CORRECTION.

Patent No. 1,817,820.   Granted August 4, 1931, to

FRANK R. HIGLEY.

It is hereby certified that error appears in the printed specification of the above numbered patent requiring correction as follows: Page 1, line 9, for the misspelled word "automative" read automotive; line 67, for "obect" read object; page 3, line 7, for "contractor" read contactor; line 31, for "opposie" read opposite; lines 95 and 96, for "mo-or" read motor; page 4, line 79, claim 5, for "driven" read drive; and that the said Letters Patent should be read with these corrections therein that the same may conform to the record of the case in the Patent Office.

Signed and sealed this 22nd day of September, A. D. 1931.

(Seal)

M. J. Moore,
Acting Commissioner of Patents.